US007697785B2

(12) United States Patent
Chiu et al.

(10) Patent No.: US 7,697,785 B2
(45) Date of Patent: Apr. 13, 2010

(54) GENERATING A HIGHLY CONDENSED VISUAL SUMMARY

(75) Inventors: Patrick Chiu, Menlo Park, CA (US); Andreas Girgensohn, Menlo Park, CA (US); Qiong Liu, Milpitas, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 1022 days.

(21) Appl. No.: 10/815,354

(22) Filed: Mar. 31, 2004

(65) Prior Publication Data

US 2005/0220345 A1    Oct. 6, 2005

(51) Int. Cl.
*G06K 9/36* (2006.01)
(52) U.S. Cl. ........................................ 382/284; 382/167
(58) Field of Classification Search ................. 382/190, 382/284, 167, 170, 209, 274; 345/629, 641; 348/584, 601
See application file for complete search history.

(56) References Cited

U.S. PATENT DOCUMENTS

| | | | |
|---|---|---|---|
| 5,048,109 A | 9/1991 | Bloomberg et al. | |
| 5,341,439 A | 8/1994 | Hsu | |
| 5,553,207 A | 9/1996 | Sekiguchi | |
| 5,761,338 A * | 6/1998 | Kasamatsu | 382/176 |
| 6,081,615 A * | 6/2000 | Yasui | 382/162 |
| 6,246,790 B1 | 6/2001 | Huang | |
| 6,292,575 B1 | 9/2001 | Bortolussi | |
| 6,307,964 B1 * | 10/2001 | Lin et al. | 382/203 |
| 6,430,312 B1 | 8/2002 | Huang | |
| 6,470,095 B2 | 10/2002 | Mahoney et al. | |
| 6,562,077 B2 | 5/2003 | Bobrow | |
| 6,697,523 B1 | 2/2004 | Divakaran | |
| 6,819,793 B1 | 11/2004 | Reshetov | |
| 6,819,795 B1 | 11/2004 | Chiu | |
| 6,922,485 B2 * | 7/2005 | Hirata | 382/164 |

(Continued)

OTHER PUBLICATIONS

Boreczky, John, et al., "An Interactive Comic Book Presentation for Exploring Video," *Proc. CHI '00*, ACM Press, pp. 185-192 (2000).

(Continued)

*Primary Examiner*—Brian Q Le
*Assistant Examiner*—Edward Park
(74) *Attorney, Agent, or Firm*—Fliesler Meyer LLP

(57) ABSTRACT

In one embodiment, the present invention extracts video regions of interest from one or more videos and generates a highly condensed visual summary of the videos. The video regions of interest are extracted based on to energy, movement, face or other object detection methods, associated data or external input, or some other feature of the video. In another embodiment, the present invention extracts regions of interest from images and generates highly condensed visual summaries of the images. The highly condensed visual summary is generated by laying out germs on a canvas and then filling the spaces between the germs. The result is a visual summary that resembles a stained glass window having cells of varying shape. The germs may be laid out by temporal order, color histogram, similarity, according to a desired pattern, size, or some other manner. The people, objects and other visual content in the germs appear larger and become easier to see. The visual summary of the present invention utilizes important regions within the key frames, leading to more condensed summaries that are well suitable for small screens.

17 Claims, 18 Drawing Sheets

U.S. PATENT DOCUMENTS

| | | | |
|---|---|---|---|
| 7,035,435 B2 * | 4/2006 | Li et al. ............... 382/107 |
| 7,043,094 B2 | 5/2006 | Thomas |
| 7,085,401 B2 | 8/2006 | Averbuch |
| 7,091,969 B2 * | 8/2006 | Leow et al. ............ 345/420 |
| 7,110,007 B2 | 9/2006 | Odagawa |
| 7,239,743 B2 | 7/2007 | Gardella |
| 7,295,700 B2 | 11/2007 | Schiller |
| 2001/0020981 A1 * | 9/2001 | Jun et al. ............. 348/426.1 |
| 2001/0040980 A1 | 11/2001 | Yamaguchi |
| 2002/0126143 A1 * | 9/2002 | Bae et al. ............... 345/723 |
| 2002/0126203 A1 * | 9/2002 | Yu et al. ................ 348/61 |
| 2003/0108238 A1 | 6/2003 | Xu |
| 2006/0023786 A1 * | 2/2006 | Li et al. ............. 375/240.16 |
| 2006/0126932 A1 | 6/2006 | Eschbach |

OTHER PUBLICATIONS

Cai, Deng, et al., "Hierarchical Clustering of WWW Image Search Results Using Visual, Textual and Link Information," *Proc. of ACM Multimedia '04*, pp. 952-959 (2004).

Chen, Francine, et al., "Multi-Modal Browsing of Images in Web Documents," *Proc. of SPIE Document Recognition and Retrieval VI* (1999).

Chiu, Patrick, et al., "Stained-Glass Visualization for Highly Condensed Video Summaries," *Proc. IEEE Intl. Conf. on Multimedia and Expo (ICME '04)* (2004).

Girgensohn, Andreas, et al., "Stained Glass Photo Collages," *UIST '04 Poster*, pp. 13-14 (2004).

Ide, Nancy, et al., "Word Sense Disambiguation: The State of the Art," *Computational Linguistics*, 24(1), pp. 1-40, 1998.

Kerne, Andruid, "*CollageMachine: A Model of 'Interface Ecology,'*" NYU Ph.D. Dissertation (2001).

Li, Zhi-Wei, et al., "Intuitive and Effective Interfaces for WWW Image Search Engines", *ACM Multimedia '04 Demo*, 2004.

Ma, Yu-Fei, et al., "Contrast-based Image Attention Analysis by Using Fuzzy Growing," *Proc. of ACM Multimedia '03*, pp. 374-381.

Mukherjea, Sougata, et al., "Using Clustering and Visualization for Refining the Results of a WWW Image Search Engine", *Proc. 1998 Workshop on New paradigms in Information Visualization and Manipulation*, ACM Press, pp. 29-35 (1998).

Suh, Bongwon, et al., "Automatic Thumbnail Cropping and Its Effectiveness," *Proceedings of UIST '03*, pp. 95-104 (2003).

Wang, Xin-Jing, et al., "Multi-Model Similarity Propagation and Its Application for Web Image Retrieval," *Proc. of ACM Multimedia '04*, pp. 944-951 (2004).

Wang, Xin-Jing, et al., "Grouping Web Image Search Result," *ACM Multimedia '04 Poster* (Oct. 10-16, 2004), pp. 436-439 (2004).

Wang, Ming-Yu, et al., "MobiPicture—Browsing Pictures on Mobile Devices," *ACM Multimedia '04 Demo* (Nov. 2-8, 2003), pp. 106-107 (2003).

Christel, M. Winkler, D., Taylor, C. (1997). Multimedia abstractions for a digital video library. Proc. ACM Intl. Conf. on Digital Libraries (DL '97), pp. 21-29.

Elliot, E.L. (1993). Watch-Grab-Arrange-See: Thinking with Motion Images via Streams and Collages. MIT MS Visual Studies Thesis, Feb. 1993.

Peyrard, N., Bouthemy, P. (2003). Motion-based selection of relevant video segments for video summarisation. Proc. Intl. Conf. on Multimedia and Expo (ICME 2003).

Uchihashi, S., Foote, J., Girgensohn, A., and Boreczky, J. (1999). Video Manga: Generating semantically meaningful video summaries. Proceedings ACM Multimedia '99, pp. 383-392.

Yeung, M., Yeo, B.-L. (1997). Video visualization for compact presentation and fast browsing of pictorial content. IEEE Trans. Circuits and Syst. Video Technol., 7, 5 (Oct. 1997), 771-785.

* cited by examiner

600

610
612
614

615

620

1300

1600

1700

US 7,697,785 B2

GENERATING A HIGHLY CONDENSED VISUAL SUMMARY

CROSS REFERENCE TO RELATED APPLICATIONS

The present application is related to the following United States patents and patent applications, which patents/applications are assigned to the owner of the present invention, and which patents/applications are incorporated by reference herein in their entirety:

U.S. patent application Ser. No. 10/815,389, entitled "EXTRACTING VIDEO REGIONS OF INTEREST", filed on Mar. 31, 2004 by Patrick Chiu, et al., which issued as U.S. Pat. No. 7,639,839 on Dec. 29, 2009.

FIELD OF THE INVENTION

The current invention relates generally to digital image display systems, and more particularly to generating a highly condensed visual summary of video and images.

BACKGROUND OF THE INVENTION

With more and more digital images, video and multimedia content being created, people want to be able to access this content using more types of devices, including cell phones, PDAs, notebook computers, laptop computers, and other mobile devices, as well as non-mobile devices such as desktop computers, work stations, and other devices having or in communication with a monitor of some sort. With regard to mobile devices, it is challenging to browse video on small wireless mobile devices such as PDAs and cell phones. Typically, the small screen restricts how much content can be displayed.

Existing techniques for visualizing video summaries are not designed for small screens and do not work well on them. As a result, visual summaries typically do not work well on smaller screens, such as these found on mobile devices. One popular method is to use a storyboard with a number of important key frames extracted from the video using content analysis algorithms. An example of a storyboard display is illustrated in FIG. 1. The layout may have same-sized images or different-sized images. When viewed on a small screen, it is difficult to see what is in the images. What is needed is a system and method for generating a visual video summary that overcomes the shortcomings and disadvantages of the prior art.

SUMMARY OF THE INVENTION

In one embodiment, the present invention extracts video regions of interest from one or more videos and generates a highly condensed visual summary of the videos. The video regions of interest are extracted based on energy, movement, face or other object detection methods, associated data or external input, or some other feature of the video. In another embodiment, the present invention receives or extracts germs of interest from images and generates highly condensed visual summaries of the images.

In one embodiment, the region of interest is comprised of two parts, a germ and a support. The highly condensed visual summary is generated by laying out germs on a canvas and then filling the spaces between the germs. The result is a visual summary that resembles a stained glass window having sections of varying shape. The germs may be laid out by temporal order, color histogram, similarity, according to a desired pattern, size, or some other manner. The people, objects and other visual content in the germs appear larger and become easier to see. In one embodiment of the present invention, the irregular shaped cell boundaries result from a Voronoi-based algorithm for filling the spaces between the packed germs.

DETAILED DESCRIPTION

In one embodiment, the present invention extracts video regions of interest from one or more videos and generates a highly condensed visual summary of the videos. The video regions of interest are extracted based on energy, movement, face or other object detection methods, associated data or external input, or some other feature of the video. In another embodiment, the present invention receives or extracts germs of interest from images and generates highly condensed visual summaries of the images.

In one embodiment, the region of interest is comprised of two parts, a germ and a support. The highly condensed visual summary is generated by laying out germs on a canvas and then filling the spaces between the germs. The result is a visual summary that resembles a stained glass window having sections of varying shape. The germs may be laid out by temporal order, color histogram, similarity, according to a desired pattern, size, or some other manner. The people, objects and other visual content in the germs appear larger and become easier to see. In one embodiment of the present invention, the irregular shaped cell boundaries result from a Voronoi-based algorithm for filling the spaces between the packed germs. The visual summary of the present invention utilizes important sub-regions within the key frames, leading to more condensed summaries that are well suitable for small screens.

Generation of the Visual Summary

Figure 1:
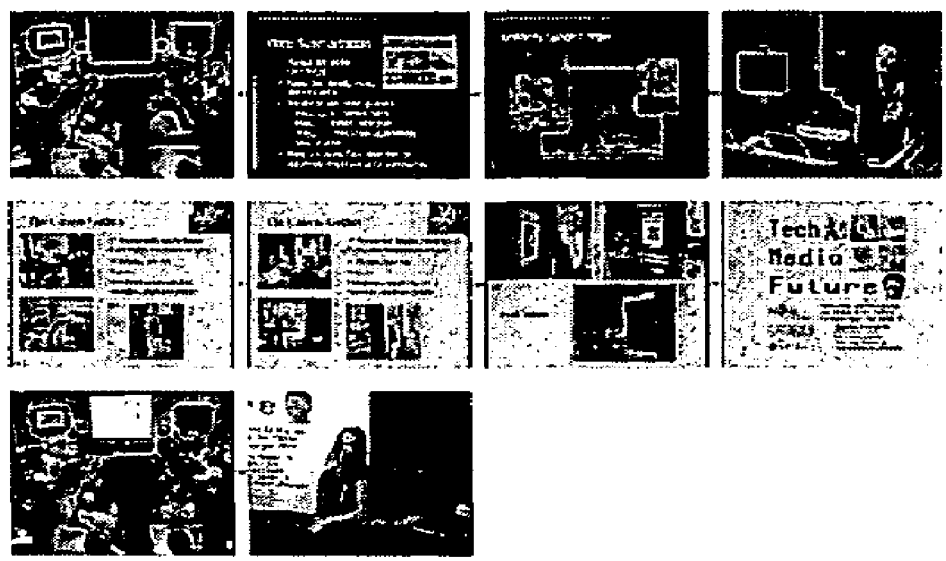
FIG. 1 is an illustration of a storyboard summary of videos using key frames in accordance with the prior art.
Figure 2:
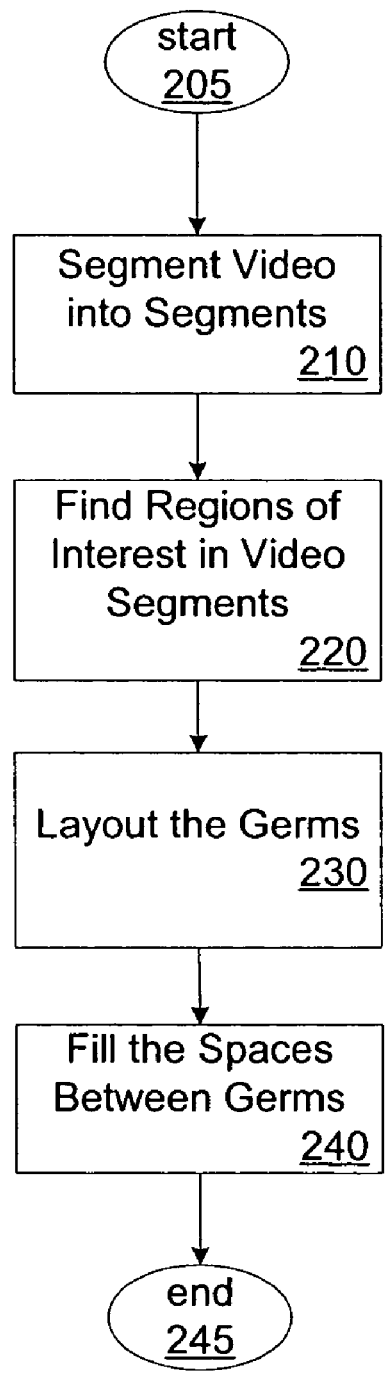
FIG. 2 is an illustration of method for extracting video regions and generating a highly condensed visual summary of the video in accordance with one embodiment of the present invention.

A method 200 for extracting video regions and generating a highly condensed visual summary is illustrated in FIG. 2. Method 200 begins with start step 205. Next, video is segmented into segments at step 210. Regions of interest are then determined from the video segments at step 220. Once the regions are determined, the regions of high importance are laid out onto a canvas at step 230. Then, the spaces between regions of high importance are filled at step 240 and method 200 ends at step 245. Each of these operations is discussed in more detail below.

Segmenting Video into Clips

The video may be segmented into one or more segments using a variety of methods. A video consists of consecutive frames of images. In one embodiment, the video is segmented into video segments so that each clip consists of successive frames that are similar. This can be done using standard techniques such as color histograms, user input, or some other means. Another technique is use of available camera on/off information to determine the temporal boundaries of the video segment, thereby providing true shot boundaries that can help produce better segments.

In one embodiment, a granularity for subsampling the video frame images may be set. The sampling rate may be chosen based on the application, the processing power available, the specifications of the device to provide the condensed summary, and other features. In one embodiment, for common usage and easy display in mobile devices, a fairly low sampling rate of 16 pixels along the width and 12 pixels along the height per video image may be used. Additionally, the images may be smoothed to reduce the noise.

Find Regions of Interest

Figure 3:
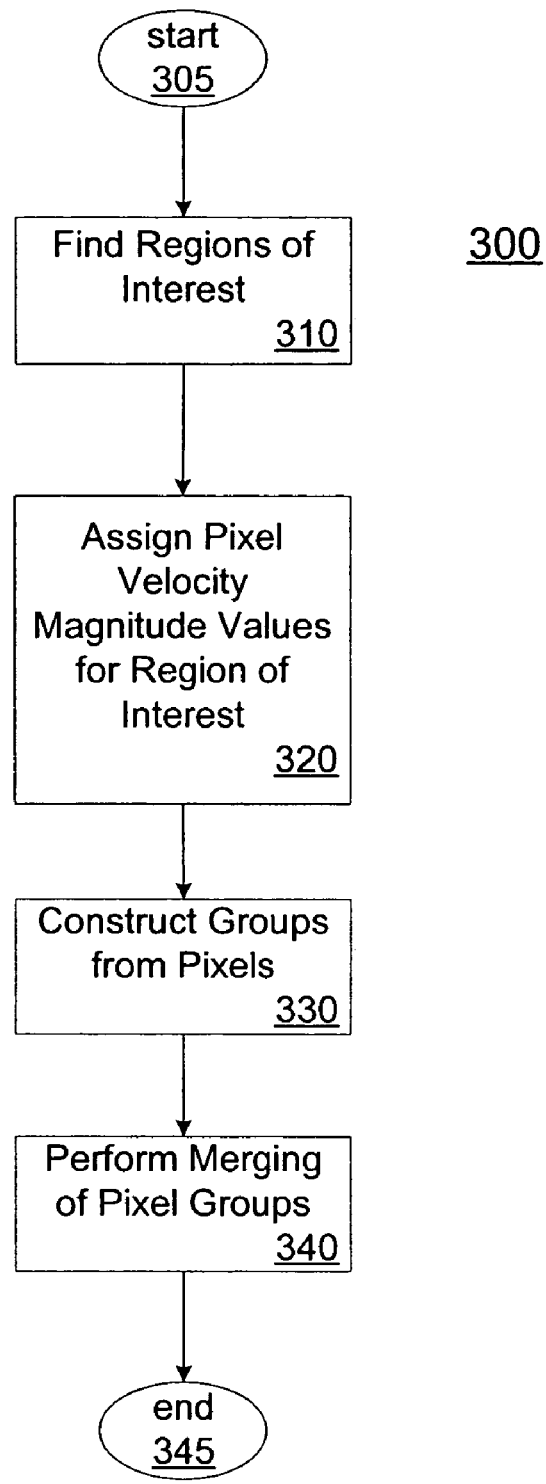
FIG. 3 is an illustration of a method for finding regions of interest in video in accordance with one embodiment of the present invention.
Figure 4:
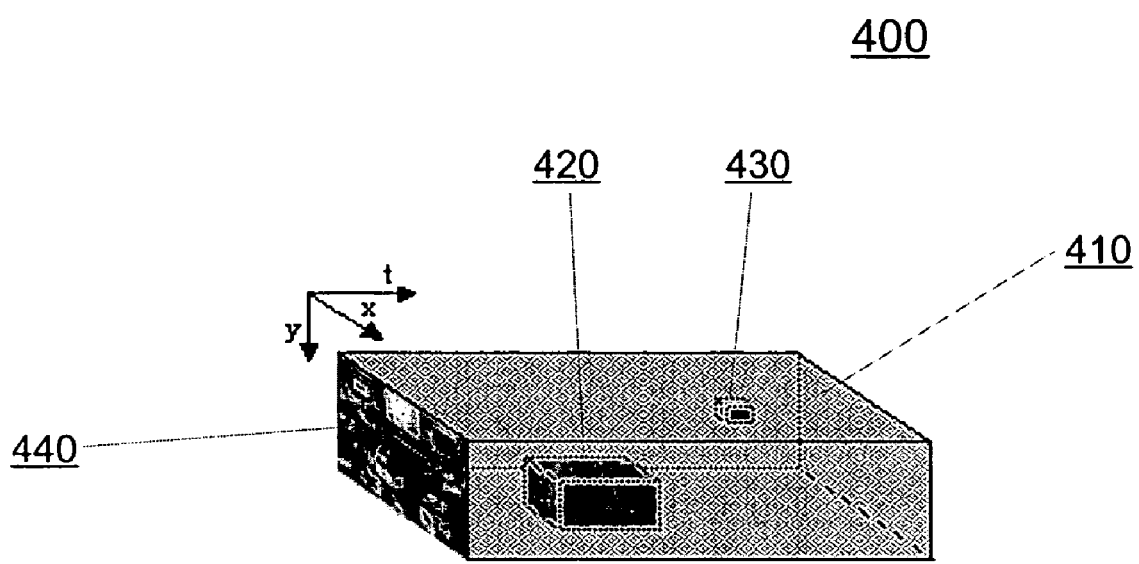
FIG. 4 is an illustration of a video represented in x-y-t space in accordance with one embodiment of the present invention.

After the video is segmented into one or more video segments in step 210 of method 200, the regions of interest are determined in the video clips. Method 300 of FIG. 3 illustrates a process for finding regions of interest in accordance with one embodiment of the present invention. Method 300 begins with start step 305. Next, regions of interest are determined within the video segment at step 310. A video can be regarded as a three dimensional volume in x-y-t space. An exemplary representation of a three dimensional volume of video is shown in FIG. 4. As shown, video segment 410 may consist of a first frame 440 and several successive frames along the t axis. A region may be characterized as a subset three dimensional region within the x-y-z space of the three dimensional video segment 410. The regions 420 and 430 are located within three dimensional volume of video 410.

Regions of interest may be determined in many ways. In one embodiment, a region may be determined to be a three dimensional space having relatively high activity or kinetic energy. Several methods may also be used to determine the energy or activity of a region. In one embodiment, to measure energy, a velocity field may be computed. In this case, each sampled pixel is assigned a velocity. The velocity can be obtained by calculating the change in the luminance between video frames. In one embodiment, the velocity change may be computed from change in the t-component of the velocity. In another embodiment, the change in velocity may be computed from the change in luminance using all the x, y, and t components. In this case, computing velocity from all the components requires more processing but is likely to produce better results.

In one embodiment, it may be desirable to determine the change in luminance or velocity using the residual motion of a region. Residual motion is the resulting motion after the motion of the camera or the background motion has been removed or subtracted. There are various types of camera motion such as pan, tilt and zoom, and methods to detect these types have been developed. In one embodiment, the residual motion may be determined by subtracting the average motion of the frame from the change in motion for the particular pixel.

Next in method 300, for each pixel (in x-y-t space) in the video segment, the magnitude of the velocity for each pixel in the region of interest is assigned a value at step 320. In one embodiment, the value may be assigned to lie within a pixel range. The pixel range may be selected based upon the processing power and the desired detail of the regions to be generated. In another embodiment, the magnitude of the velocity may be quantized to within a range of binary values of zero and one. In the embodiment using a binary range of zero and one, pixels having a magnitude above average (above the average of all the sampled pixel magnitudes in the particular video segment) may be set to one and the remainder of the pixels may be set to zero. In this embodiment, the analysis and processing may be focused on the set of pixels with a value of one, thereby reducing the computation time substantially.

Next, groups are constructed from the one-valued pixels at step 330 of method 300. In one embodiment, the regions are constructed by grouping neighboring one-pixels. For two dimensional bitmap images, at each iteration, pixels that are within a small distance to a one-value pixel are turned into a one-value pixel. The small distance may depend on the application; it is typically one pixel, but may be any range, including but not limited to one to five pixels. However, any number of pixels or range may be used to group nearby one-value pixels. After some number of iterations, groups or "blobs" of one-value pixels appear. These groups can have highly irregular shapes. Computationally, this is much more expensive for a three dimensional volume associated with a video. Furthermore, during the region construction process and later in the layout step, geometric properties such as intersection and containment of regions are obtained, and algorithms for these computations are more complex in three dimensions than two dimensions as well.

After groups are constructed in step 330, operation continues to step 340 wherein larger groups are formed by merging one-pixel groups. In one embodiment, rectangular shaped boxes are used to represent the regions of high importance.

Rectangular shaped regions are discussed herein for purposes of illustration only, and it is intended that regions may be grouped and constructed in any shape or combination of shapes. To construct regions of high importance, adjacent one-pixel groups constructed from step 330, which are degenerate boxes, are merged into a larger group at step 340.

In one embodiment, if two one-pixel groups are adjacent, they are merged into a larger group, thereby forming a region of high importance, provided that they don't fail one or more stopping conditions. In this embodiment, the stopping conditions keep the groups from spreading too thin. Stopping conditions within the scope of the present invention may be based on energy density, volume, and other characteristics. In one embodiment, the resulting larger group is in the shape of the smallest three dimensional rectangular box that contains both smaller groups of one-pixels. Rectangular shaped groups are discussed herein for example purposes only. Regions may be constructed and grouped in any shape or using many types of formulas. After the one-pixel groups are merged at step 340, operation of method 300 ends a step 345.

As discussed above, the stopping conditions may be based on many characteristics. One such characteristic is energy density. In one embodiment of the present invention, the energy density should not be allowed to decrease beyond a certain threshold after a merge such as that performed at step 340. For example, the density of a group A may be represented by $d(A)$, which is the number of 1-pixels in group A divided by the total number of pixels contained in the bounding box of A.

The density of a neighboring group B may similarly represented by $d(B)$. The average density of the whole video segment may be represented by $d(W)$. In this case, the two groups A and B can be merged into group C if $d(C)>d(W)$. Comparing the energy density of the merged group to the average energy density is for exemplary purposes only. Other thresholds for energy density can be used and are intended to be within the scope of the present invention.

In another embodiment, the volume of a merged group should not expand beyond a certain threshold when two or more groups are merged as performed at step 340 in method 300. For example, the volume of a bounding box for a group A may be represented as $v(A)$. Similarly, the bounding box for a group B may be represented as $v(B)$. For groups A and B, their intersection can be represented as K. In this case, if $v(K)/v(A)<\frac{1}{2}$ and $v(K)/v(B)<\frac{1}{2}$, A and B may not be merged. Comparing the volume of the intersection of two merged groups to each of the groups is for exemplary purposes only. Other volume comparisons can be used and are intended to be within the scope of the present invention.

In one embodiment, the result of the iterative merging process may be compared to a forest of trees, where each tree represents a group, and the leaves of the tree are 1-pixels. The trees are not binary; each node can have more than two children. The bounding box of each tree is a region.

Layout the Regions of High Importance

Figure 5:
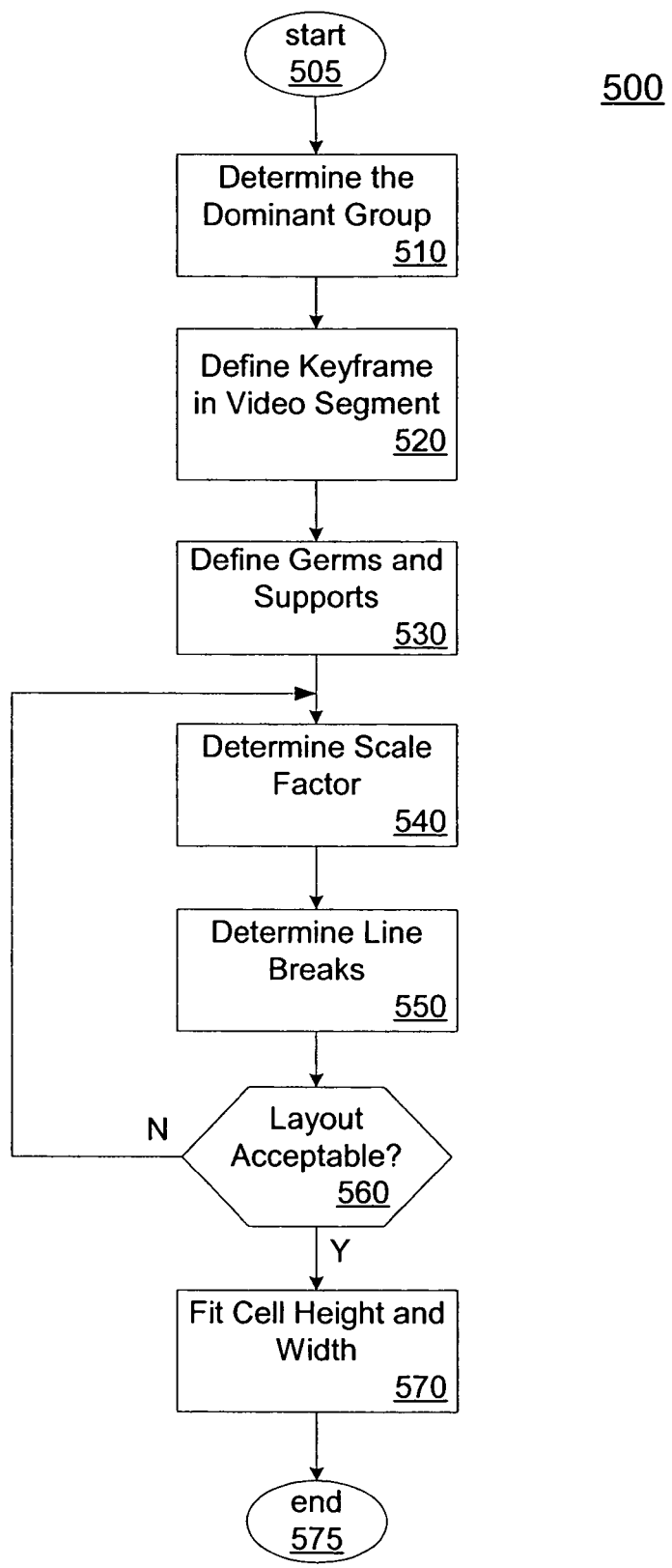
FIG. 5 is an illustration of a method for laying out germs in accordance with one embodiment of the present invention.

In method 200 of FIG. 2, after finding the regions of interest in the video clips at step 220, the next step 230 is to layout the germs. At this stage in operation of method 200, the video has been segmented into segments such as segment 410 in FIG. 4 and, for each segment, groups or regions of high importance have been computed, such as groups or regions 420 and 430. The process of generating a layout from the groups of high importance is illustrated by method 500 of FIG. 5. Method 500 begins with start step 505. Next, the dominant groups in one or more segments are determined at step 510. In a segment, there is often a single dominant group.

In one embodiment, the dominant groups are the areas with the most energy, motion, or volume, or are important for other reasons. For example, for a video of a presentation, the dominant groups may include a person at a podium talking and gesturing, and people sitting in a section of the room moving around. The dominant groups from each clip of the video are selected to be laid out.

A key frame is then defined for each video segment at step 520. In one embodiment, the first frame of each segments is taken to be the key frame. However, key frames may be determined in a variety of ways, all considered to be within the scope of the present invention.

Next in method 500, a germ and support are defined for each dominant group at step 530. In one embodiment, each group is associated with two rectangles that determine the layout: (1) the group's three dimensional bounding box, and (2) the key frame image's two dimensional bounding box. With these rectangles in mind, a germ may be considered the x-y projection of the group onto the key frame. A germ's support is the image content area that surrounds the germ in the key frame.

Figure 6A:
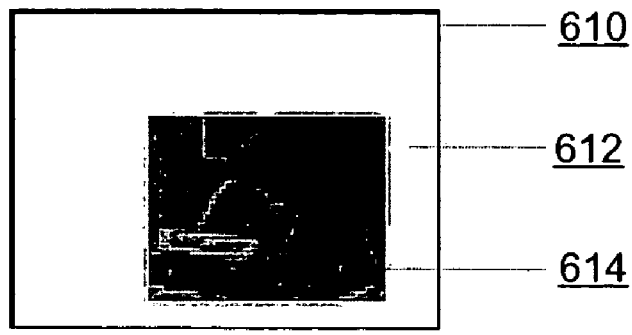
FIG. 6A is an illustration of a germ in accordance with one embodiment of the present invention.
Figure 6B:
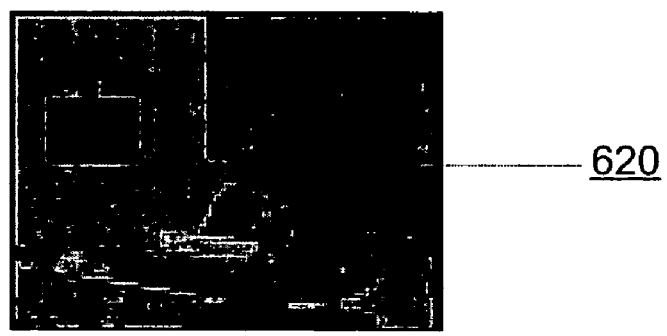
FIG. 6B is an illustration of a germ and the germ's support in accordance with one embodiment of the present invention.

FIGS. 6A and 6B illustrate a germ and the germ's support, respectively, in accordance with one embodiment of the present invention. In FIG. 6A, the key frame image bounding box 610 encompasses the germ image 614 and the space occupied by the germ's support 612. In the embodiment illustrated in FIGS. 6A and 6B, the germ is a sub-area of the key frame. Note that the germ's support 612 in FIG. 6A is blank to illustrate the space it resides in. FIG. 6B illustrates the germ and the support together in space 620. FIGS. 6A and 6B represent examples of germs and germ supports that are shaped as rectangles for illustrative purposes only. In another embodiment, the germ and support can be irregularly shaped. In yet another embodiment, the germ's support may be extended beyond the key frame's bounds using techniques such as video mosaic algorithms to create larger panoramic images. It is intended that germs and germ supports can be any shape, similar or different from each other, static or varying, in accordance with the present invention.

Optionally, once the germs are selected, the ordering of the germs may then be determined (not shown in method 500). The ordering of the germs may be determined in any of numerous ways, including temporal, size, color characteristic, content, or by other data derived from or associated with the particular germ.

A scale factor is then determined for the dominant regions at step 540. In one embodiment, the scale factor corresponds to the maximum scale factor for the germs such that the germs can be placed in rows or columns that fill up the canvas. The scale factor can be iteratively adjusted until the most desirable scaling is achieved. In one embodiment, the same scaling factor is applied to all the germs to be displayed. In another embodiment, the scaling factor may differ among germs. In any case, the scaling factor determination at step 540 may be performed separately from the line break determination step 550 as shown in method 500 or at the same time.

Figure 7:
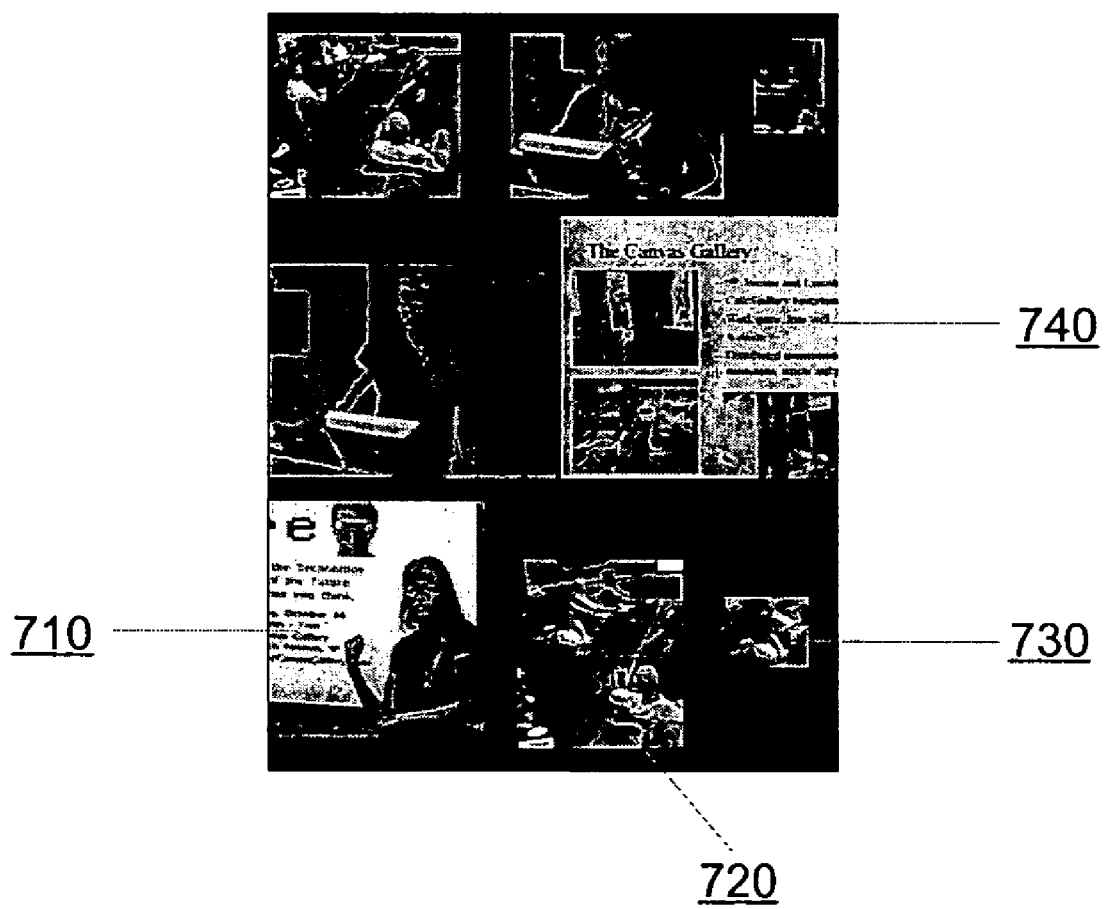
FIG. 7 is an illustration of a canvas containing germs in accordance with one embodiment of the present invention.

Next, line breaks are determined at step 550 for the placing of the regions on the canvas or display page. In one embodiment, this is analogous to laying out a paragraph of text with word-wrap, such that the text "wraps" around the size of the page showing the text. In an embodiment wherein the germs are placed in horizontal rows, the line breaks are chosen so that the packing of the germs, line by line from left to right, results in a packing whose bounding space is closest to the aspect ratio of the canvas shape. An example of a canvas 700 that with a layout of germs having line breaks is illustrated in FIG. 7. Canvas 700 includes germs, including germ 710, 720 and 730, and background 740. The germs are broken into three rows, each having three, two and three germs, respectively. In another embodiment, instead of determining line breaks one row at a time, it is feasible for small numbers N of germs to exhaustively list all combinations of placing them in 1 to N rows. For each combination, a quality measure such as the size of the covered area can be determined, and the best combination can be picked. In another embodiment, the germs may be placed in vertical columns, in rows of concentric circles, or in any other manner wherein a plurality of ordered germs require "breaks" in order to be displayed on a page.

At step 560, it is determined whether the layout is acceptable. In one embodiment, the layout is acceptable if the scale factor is the largest magnitude that allows all germs to be displayed on the canvas. If the layout is not acceptable, then operation of method 500 continues to step 540. If the layout is acceptable, then operation continues to step 570.

At step 570, cell height and width are set. In one embodiment, the germs are spaced out horizontally on those lines that have extra space on the right, and moved as close as possible to the center of the line along the vertical direction. This spacing and centering is constrained by the germs' supports. In one embodiment, the canvas should be covered as much as possible by the supports. An example in accordance with one embodiment of the present invention is illustrated by canvas 800 in FIG. 8. Canvas 800 includes several germs, including germs 810, 820, 830 and 840. Note that the upper right germ 840 is not centered vertically on the line because its support cannot cover enough space above it. The result is a tight packing for that germ.

Finally, to get closer to the canvas aspect ratio, the lines may be spaced farther apart provided that the support can cover the gaps. In another embodiment of the present invention, the germs can be scaled to cover all or some of the gaps on the canvas. In another embodiment of the present invention, the canvas can allow for gaps. After the cell height and width is fit to the canvas at step 570, operation of method 500 ends at step 575.

Fill the Spaces Between Regions

Once the layout of germs is completed at step 230 in method 200, the spaces between the germs are filled at step 240. In one embodiment, the spaces between regions are filled according to the Voronoi regions of the germs. The Voronoi regions partition the canvas into disjoint areas corresponding to the germs: a point (x, y) on the canvas belongs to the germ closest to it. When this point belongs to the support of the nearest germ, the pixel is assigned the same value as the corresponding pixel of the germ's support. If the nearest germ's support does not encompass the (x,y) point, the Voronoi region is not used and the next nearest germ whose support contains the (x,y) point is used to fill the point (the pixel is assigned the value of the next nearest germ whose support includes the point). If no germs include the point, the pixel can be assigned an average of nearby pixel values, a canvas background color, or some other value.

Figure 8:
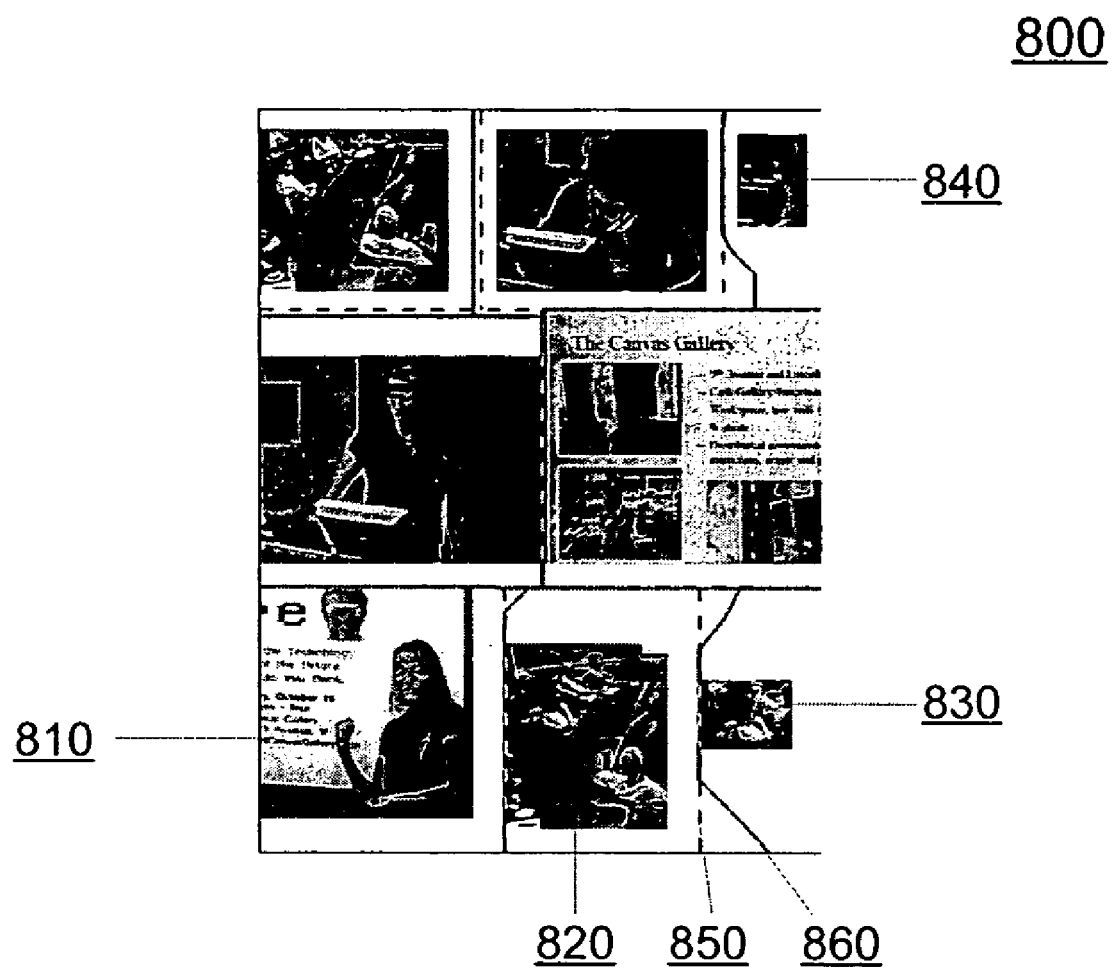
FIG. 8 is an illustration of a canvas having Voronoi regions containing germs in accordance with one embodiment of the present invention.

In one embodiment, to delineate the images in the visualization, borders may be placed around the areas from different germ and support areas. An example of a canvas 800 with highlighted germ and support area boundaries is illustrated in FIG. 8. Canvas 800 includes germs 810, 820, 830 and 840, germ cell line 850, and area border line 860. As shown, the boundary line 860 is placed around germ 830 and part of the support for germ 830.

Figure 9:
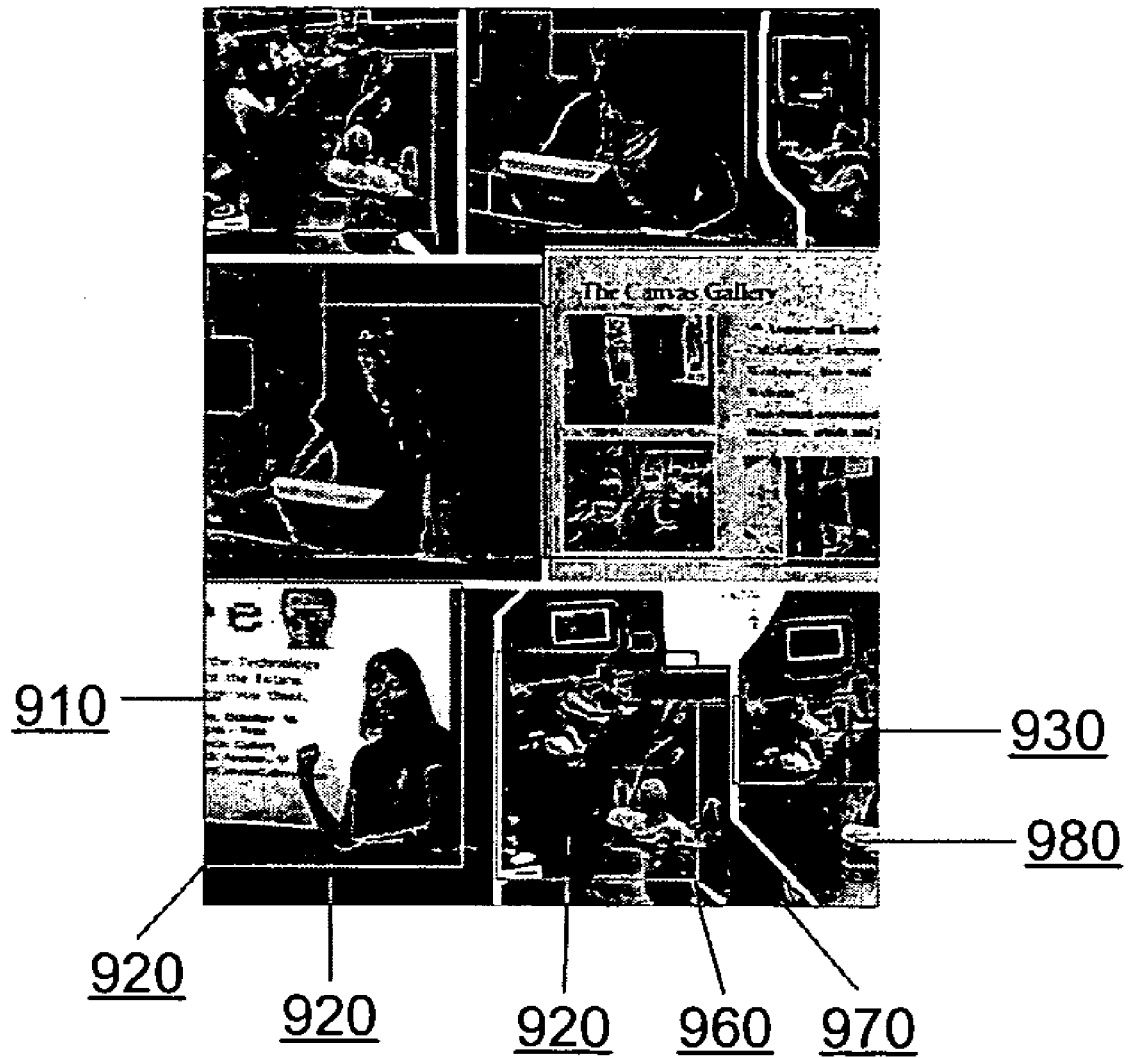
FIG. 9 is an illustration of a highly condensed visual summary of video in accordance with one embodiment of the present invention.
Figure 10:
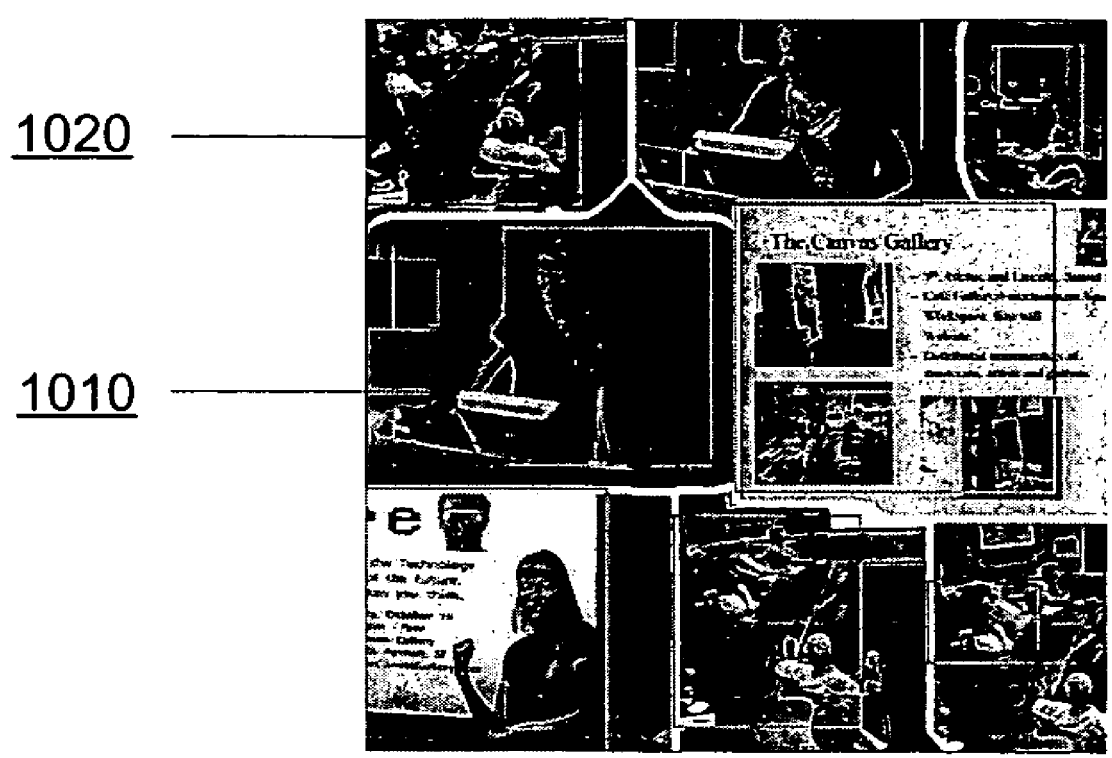
FIG. 10 is an illustration of a highly condensed visual summary of video in accordance with one embodiment of the present invention.
Figure 11:
FIG. 11 is an illustration of a highly condensed visual summary of video in accordance with one embodiment of the present invention.

After all the points on the canvas are either filled according to Voronoi regions, other nearby supports, or background, the canvas is complete. Operation of method 200 then ends at step 245. An example of a complete canvas 900 is illustrated in FIG. 9. More examples of canvases that implement different aspect ratios are shown in FIG. 10 and FIG. 11. In each of FIGS. 10 and 11, the germs are circumscribed by boxes such as 1010, 1020, 1110 and 1120, respectively, for purposes of illustration.

Figure 12:
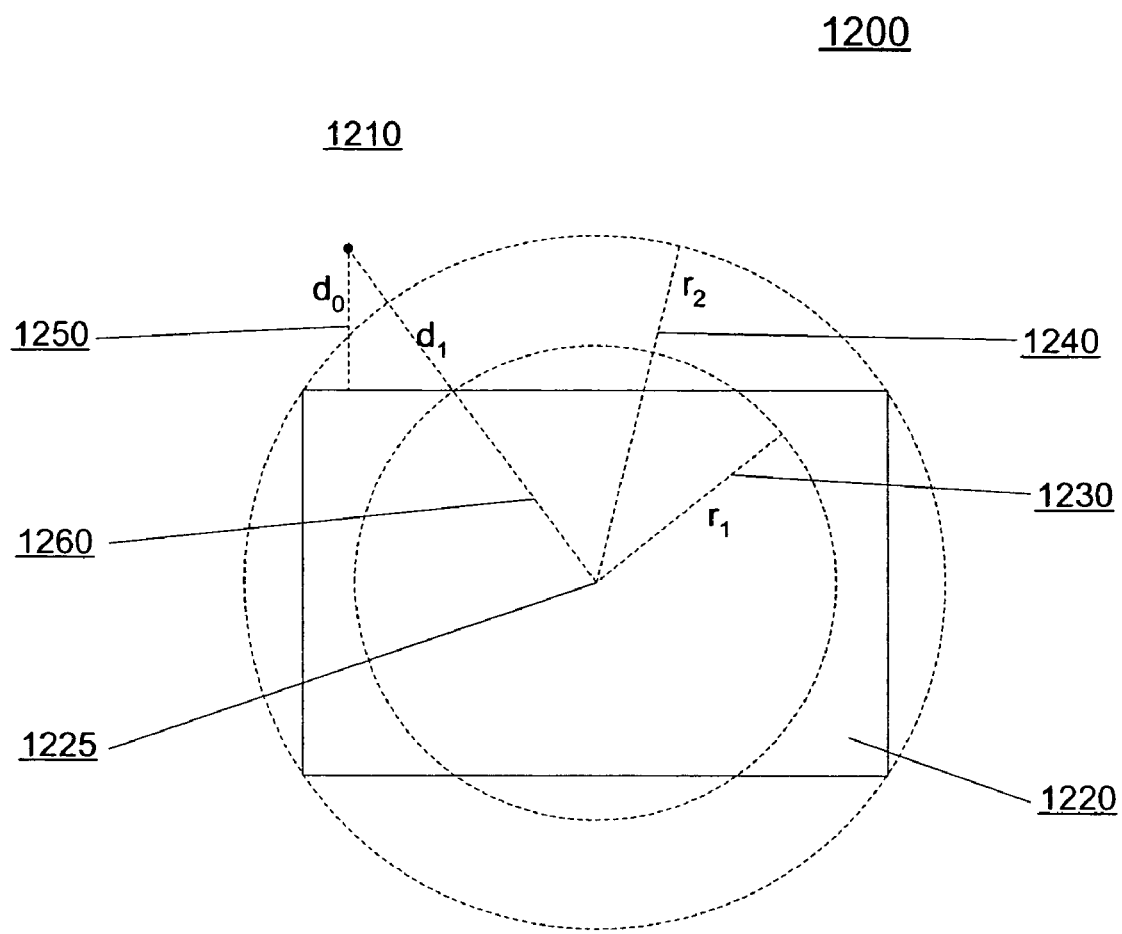
FIG. 12 is an illustration of different distance function measurements in accordance with one embodiment of the present invention.
Figure 13:
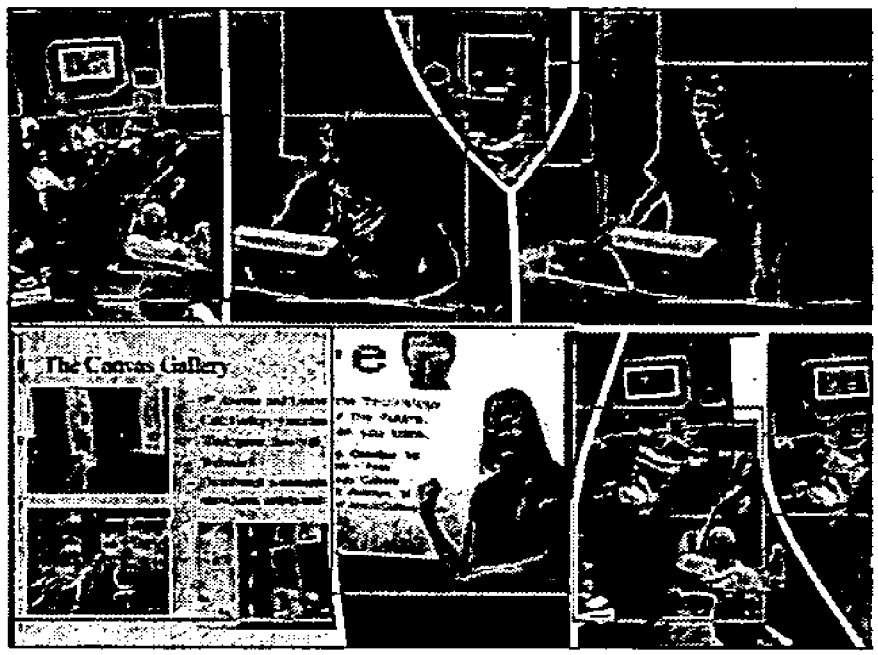
FIG. 13 is an illustration of a highly condensed visual summary of video in accordance with one embodiment of the present invention.
Figure 14:
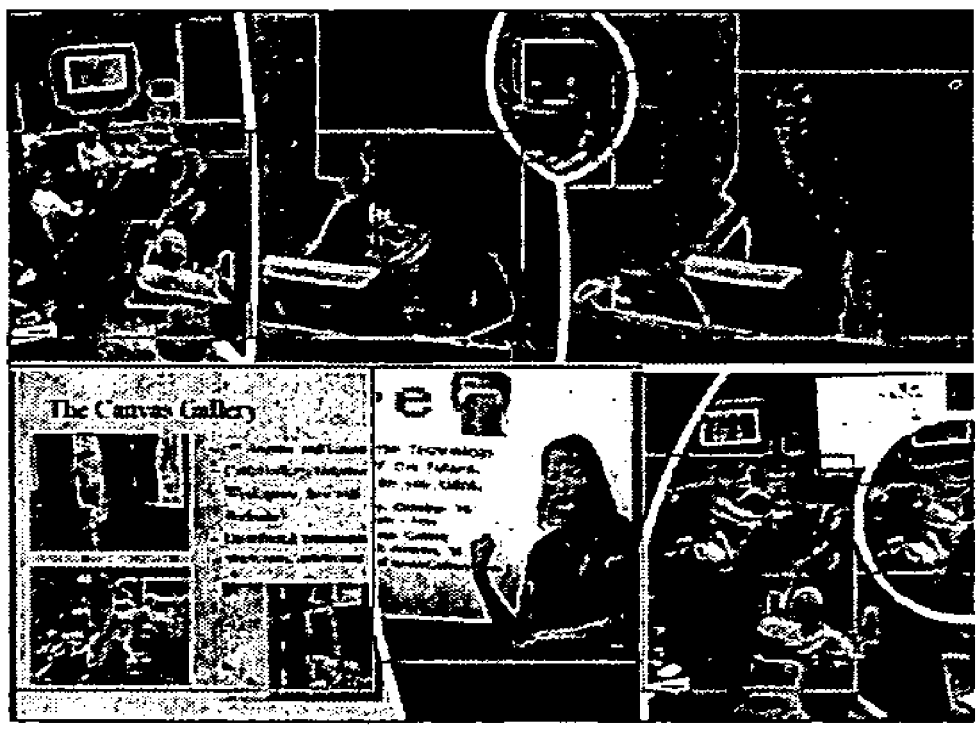
FIG. 14 is an illustration of a highly condensed visual summary of video in accordance with one embodiment of the present invention.

Voronoi diagrams often use distances from points. In different embodiments, the distances from the germ may be used. Another embodiment uses the distance between a point and the closest border of the germ. Using different distance functions during the fill process can generate different shaped regions on a canvas. In one embodiment, the distance function can be derived from a distance between a pixel and the center of a germ. FIG. 12 illustrates an example of distance function measurements 1200 in accordance with one embodiment of the present invention. FIG. 12 includes a pixel 1210 at point (x,y), a germ 1220 with center at point 1225, a first radius $r_1$ 1230, a second radius $r_2$ 1240, distance $d_0$ 1250 between the pixel and the germ and distance $d_1$ 1260 between the pixel and the center of the germ. To include the size of a germ in the distance function, two circles centered at the center of the germ are generated. The diameter of the first circle is the average of the germ's width and height, radius $r_1$ 1230. The diameter of the second circle is the germ's diagonal, radius $r_2$ 1240. The first distance function $\max(0, d_1-r_1)$ generates moderately rounded borders as shown in FIG. 13. The second distance function $d_1/r_2$ generates highly rounded borders as shown in FIG. 14. In another embodiment, these distance functions can be combined in a weighted average to vary the degree of roundedness. Other variations of distance functions may also be used, thereby achieving different types of region borders.

In one embodiment, highly condensed visual summaries can be utilized on devices having monitors or display screens that are relatively smaller, such as PDAs, cell phones, watches, small computers, digital cameras, and other devices. Once the highly condensed visual summary is displayed on these devices, a user could provide input to select the germ corresponding to the associated group. Upon selection of the germ or the germ's support, the device may playback the group on the screen of the device. Other variations of providing the groups or other actions upon the selection of a germ or its support are possible, all included within the scope of the invention.

Highly Condensed Summaries from Images and Photos

Figure 15:
FIG. 15 is an illustration of a highly condensed visual summary of images in accordance with one embodiment of the present invention.

The highly condensed summary construction can also be applied to images and photos. To find the regions of interest in an image, the regions of interest can be determined using general image analysis algorithms, face-detection, algorithms for determining salient parts of still images, user input or other object detection algorithms, or other methods. The user input could select images as a whole or portions of an image (with a mouse or other input device). Once the regions are determined, the regions can be laid out as germs with the rest of the image serving as the support. An examples of a highly condensed summary of images is illustrated in FIG. 15.

In another embodiment, the regions of interest can be received as input by a system of the present invention. In this case, the system may receive image data or other data associated with a region of interest within an image and proceed to layout the regions as germs.

In another embodiment, the layout of the germs taken from images can be done using different methods than that illustrated in method 500. In one embodiment, the detected faces are used to create an attractive collage of a collection of faces. In such a visualization, image regions are combined in a collage and the gaps between regions are filled with pixels from outside the regions of interest in the original images. Instead of regions of activity in video segments that may be used for the video summaries, faces are the regions of interest. The layout algorithm of the video summaries that kept the video segments in temporal order may be replaced with one more appropriate for a collection of faces. While the algorithm for filling gaps remains largely the same, the layout algorithm is used to produce different fill effects.

Layout

Faces to be included in the stained glass are grouped in rows. In one embodiment, to avoid having rows with few faces whose photos cannot cover the whole row, faces are divided among rows such that the number of faces per row only varies by one. In another embodiment, rows with even and odd number of faces are alternated as much as possible to generate a less-regular layout.

To avoid having similar-looking faces next to each other (same background from the same photo, photos of the same person on the same day), a random permutation of the order of faces is generated such that the temporal distance to horizontal and vertical neighboring faces is maximized. In yet another embodiment, using visual differences such as color histograms may also be used and produces a similar effect to a layout of neighboring photos from different times.

Figure 16:
FIG. 16 is an illustration of a highly condensed visual summary of images with uniform face sizes in accordance with one embodiment of the present invention.
Figure 17:
FIG. 17 is an illustration of a highly condensed visual summary of images with varied face sizes in accordance with one embodiment of the present invention.

After faces have been assigned to rows, the canvas dimensions are determined such that faces have a small percentage of their width and height as margins. In one embodiment, the faces may have 10% of their widths as horizontal margins and 20% of their heights as vertical margins. The height of each row may initially be set to that of the tallest face in it. Extra vertical space is divided evenly among the rows without extending any row past the photo dimensions of a face in it. In each row, the horizontal space is distributed in the same fashion. In one embodiment, each face is placed in the center of the cell that was created by distributing vertical and horizontal space and only shifted if their containing photos cannot not cover the whole cell. When making all faces the same size, that produced a very regular layout, as illustrated in FIG. 16. To make the collage less regular and thus more pleasing, the size of the faces is varied such that faces that cover more of their photos (close-ups) are given a larger size in the collage. Faces can be randomly placed within their cells instead of centering them, as illustrated in FIG. 17.

Filling Gaps

For the distance measure between a face and a point, we determine the Euclidian distance between the point and the center of a face and subtract the radius of the circle that encloses the face. This distance measure gives larger faces more coverage and causes slightly curved borders between areas.

Figure 18:
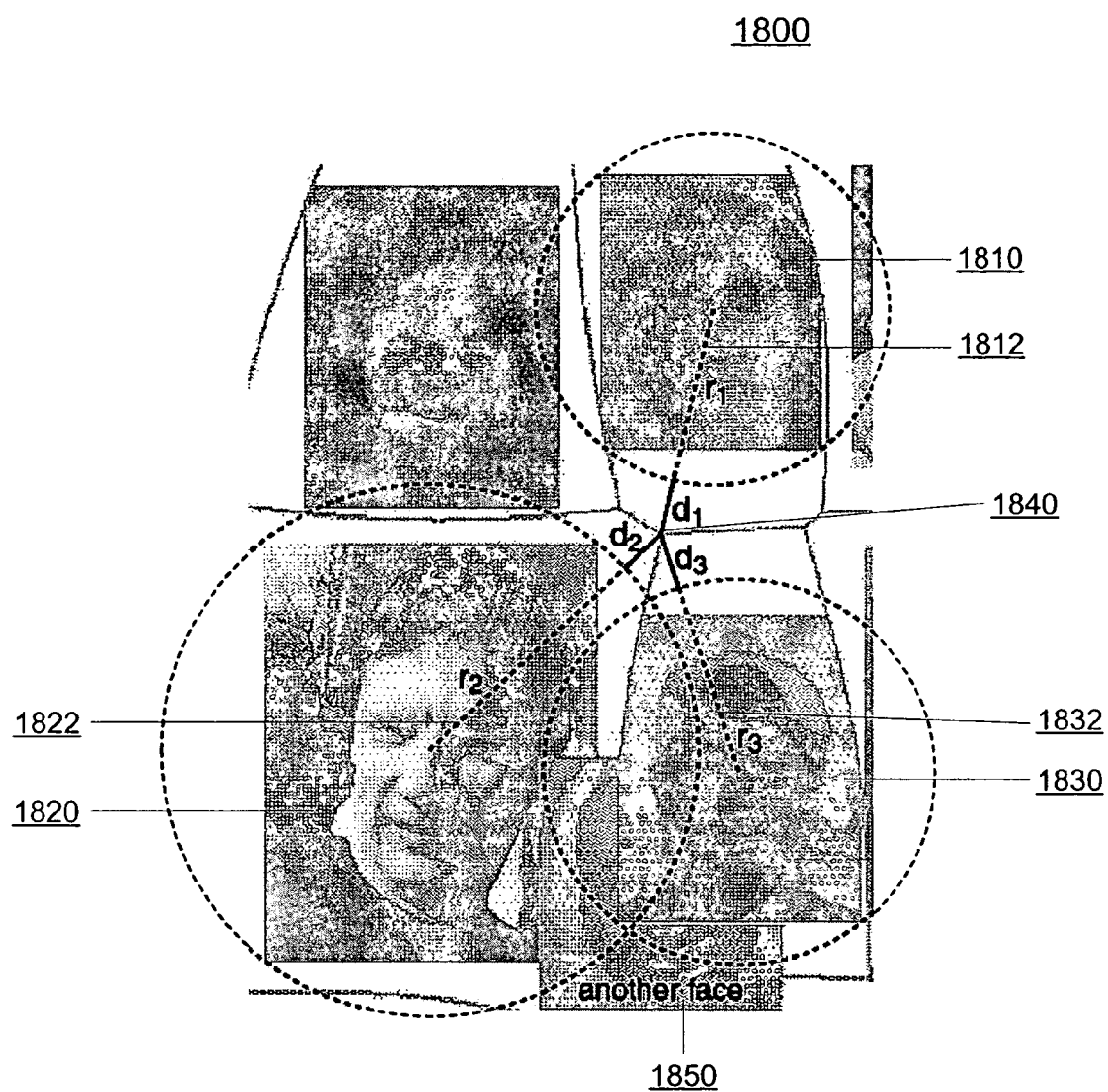
FIG. 18 is an illustration of a highly condensed visual summary of images with highlighted distance measurements in accordance with one embodiment of the present invention.

Several variations and guidelines may optionally be implemented when filling in gaps of germs in a canvas. A portion of one canvas 1800 incorporating some of the guidelines of the present invention is illustrated in FIG. 18. Canvas 1800 includes cells 1810, 1820 and 1830, each having a face, and each having a center 1812, 1822 and 1832, respectively. In the embodiment shown in FIG. 18, the distances from three faces to the point 1840 in between them are the same and thus the point represents a border among those faces. If the Euclidian distance is divided by the radius of the circle, that distance measure produces more rounded boundaries. If a photo contains other faces in addition to the face, those faces can be removed from the region the photo can cover to avoid displaying partial faces. For example, another face 1850 is part of the image in cell 1820. Accordingly, the face of 1850 was removed from the image in cell 1820. An alternative approach to dealing with several faces from the same photo would be to use a region that includes all of those faces. This approach would be appropriate if several faces from a photo are selected to be included in a canvas. In yet another embodiment, a cell may contain a partial image of one or more faces.

In one embodiment, the present invention extracts video regions of interest from one or more videos and generates a highly condensed visual summary of the videos. The video regions of interest are extracted based on energy, movement, face or other object detection methods, associated data or external input, or some other feature of the video. In another embodiment, the present invention receives or extracts germs of interest from images and generates highly condensed visual summaries of the images. In one embodiment, the region of interest is comprised of two parts, a germ and a support. The highly condensed visual summary is generated by laying out germs on a canvas and then filling the spaces between the germs. The result is a visual summary that resembles a stained glass window having sections of varying shape. The germs may be laid out by temporal order, color histogram, similarity, according to a desired pattern, size, or some other manner. The people, objects and other visual content in the germs appear larger and become easier to see. In one embodiment of the present invention, the irregular shaped cell boundaries result from a Voronoi-based algorithm for filling the spaces between the packed germs.

In the preceding description, various aspects of the present invention are described. However, it will be apparent to those skilled in the art that the present invention may be practiced with only some or all aspects of the present invention. For purposes of explanation, specific numbers, materials, and configurations are set forth in order to provide a thorough understanding of the present invention. However, it will be apparent to one skilled in the art that the present invention may be practiced without the specific details. In other instances, well-known features are omitted or simplified in order not to obscure the present invention. Other features, aspects and objects of the invention can be obtained from a review of the figures and the claims. It is to be understood that other embodiments of the invention can be developed and fall within the spirit and scope of the invention and claims.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications.

Included in the programming (software) of the general/specialized computer or microprocessor are software modules for implementing the teachings of the present invention, including, but not limited to, extracting regions of importance from video and generating highly condensed visual summaries.

The invention claimed is:

1. A computer implemented method implemented within a computer system including memory and CPU for generating a highly condensed visual summary of video regions, comprising:
    utilizing the memory and CPU for defining a germ in each of a plurality of images, the germ containing a region of interest;
    utilizing the memory and CPU for defining a support in each of the video segments, wherein the support is the video segment less the germ;
    utilizing the memory and CPU for separating the germ from the video segments;
    utilizing the memory and CPU for laying out the germs on a canvas, wherein there is no more than one germ for every video segment, wherein the canvas is partitioned into disjoint areas corresponding to the shape of the germs, wherein the shape of the disjoint areas is defined by a Voronoi algorithm; and
    utilizing the memory and CPU for filling in the space of the canvas between the disjoint areas corresponding to the shape of the germs, wherein filling in the space of the canvas between the germs includes laying out one or more portions of the supports by assigning a pixel value of a point in the space from the same value as the corresponding pixel of the germ's support when this point is nearest the germ, and only when the germ's support does not encompass the point assigning pixel values of a support of a neighboring germ based on a distance from the point to the neighboring germ, wherein a point in the space is only assigned a background value if no support includes the point, to generate a highly condensed visual summary of the plurality of video segments.

2. The method of claim 1 wherein defining a germ includes: defining a two dimensional shape that encompasses the projection of a dominant group onto the key frame.

3. The method of claim 2 wherein the two dimensional shape is a rectangle.

4. The method of claim 2 wherein laying out the germs includes:
    determining a scale factor to be applied to every germ such that the germs are scaled to the maximum size that fits into the canvas.

5. The method of claim 2 wherein laying out the germs includes:
    placing the germs in rows, wherein each row has a height according to the longest germ in the particular row.

6. The method of claim 2 wherein the two dimensional shape is irregular.

7. The method of claim 1 wherein defining a germ includes: detecting a face in each of the plurality of images.

8. The method of claim 1 wherein defining a germ includes: using an algorithm to determine a region of interest of an image.

9. A computer implemented method implemented within a computer system including memory and CPU for generating a highly condensed visual summary of video regions, comprising:
    utilizing the memory and CPU for determining a germ in each of a plurality of images, the germ containing a region of interest;
    utilizing the memory and CPU for defining a support in each of the video segments wherein the support is the video segment less the germ;
    utilizing the memory and CPU for separating the germ from the video segments;
    utilizing the memory and CPU for laying out the germs on a canvas, wherein the germs are laid out in irregular two dimensional shapes on the canvas;
    utilizing the memory and CPU for defining a space between the germs; and
    utilizing the memory and CPU for filling in the space of the canvas between the irregular two dimensional shape germs, wherein filling in the space of the canvas between the irregular two dimensional shape germs includes laying out one or more portions of the supports by assigning the same value as the corresponding pixel of the germ's support when this point is nearest the germ, and only when the germ's support does not encompass the point assigning a pixel value of a point in the space from pixel values of a support of a neighboring germ based on a distance from the point to the neighboring germ, wherein a point between the irregular two dimensional shape germs is assigned an average value of nearby point values only if no support includes the point, to generate a highly condensed visual summary of the plurality of video segments.

10. The method of claim 9 wherein determining a germ includes: detecting a face in each of the plurality of images.

11. The method of claim 9 wherein determining a germ includes: receiving user input, the user input associated with a part of an image.

12. The method of claim 9 wherein determining a germ includes: using an algorithm to determine the regions of interest of an image based on one or more methods selected from the group consisting of a face-detection algorithm, an object detection algorithms and user input.

13. The method of claim 9 wherein laying out the germs includes: determining a scale factor to be applied to every germ such that the germs are scaled to the maximum size that fits into the canvas.

14. The method of claim 9 wherein laying out the germs includes: placing the germs in rows, wherein each row has a height according to the longest germ in the particular row.

15. A computer implemented method implemented within a computer system including memory and CPU for generating a highly condensed visual summary of video regions, comprising:

utilizing the memory and CPU for determining a dominant group in each of a plurality of video segments, wherein the dominant group includes a face;

utilizing the memory and CPU for determining a key frame in each of the video segments;

utilizing the memory and CPU for defining a germ associated with each dominant group in each of the video segments, wherein the germ is the x-y projection of the dominant group including the face onto the keyframe;

utilizing the memory and CPU for separating the germ from the video segments;

utilizing the memory and CPU for laying out the germs on a canvas, wherein the canvas is partitioned into disjoint areas corresponding to the germs, wherein the shape of the disjoint areas is defined using one or more algorithm selected from the group consisting of the distances between the germs, the distance between the face and the germ and the distance between two or more faces and the germ; and utilizing the memory and CPU for filling in the space of the canvas between the disjoint areas corresponding to the germs, wherein filling in the space of the canvas between the germs includes laying out one or more portions of the supports by assigning a pixel value of a point in the space from the same value as the corresponding pixel of the germ's support when this point is nearest the germ, and only when the germ's support does not encompass the point assigning pixel values of a support of a neighboring germ based on a distance from the point to the neighboring germ, wherein a point between the irregular two dimensional shape germs is assigned an average value of nearby point values only if no support includes the point, wherein the canvas generated is a highly condensed visual summary of the plurality of video segments.

16. A computer implemented method implemented within a computer system including memory and CPU for generating a highly condensed visual summary of video regions, comprising:

utilizing the memory and CPU for determining a germ in each of a plurality of images, the germ containing a region of interest;

utilizing the memory and CPU for defining a support in each of the video segments, wherein the support is the video segment less the germ;

utilizing the memory and CPU for separating the germ from the video segments;

utilizing the memory and CPU for laying out the germs on a canvas, wherein the canvas is partitioned into disjoint areas corresponding to the shape of the germs;

utilizing the memory and CPU for computing boundary curves between the germs, wherein the boundary curves between the germs are defined using one or more algorithm selected from the group consisting of the distance between a point and the closest border of the germ, the distance between a point and the center of a germ and the distance between a point and the size of the germ;

utilizing the memory and CPU for defining a space between the boundary curves; and utilizing the memory and CPU for filling in the space of the canvas, wherein filling in the space of the canvas includes laying out one or more portions of the supports by assigning a pixel value of a point in the space from the same value as the corresponding pixel of the germ's support when this point is nearest the germ, and only when the germ's support does not encompass the point assigning pixel values of a support of a neighboring germ based on a distance from the point to the neighboring germ, wherein a point between the boundary curves is assigned an average value of nearby point values only if no support includes the point, to generate a highly condensed visual summary of the plurality of video segments.

17. The computer implemented method of claim 16 wherein the germs are laid out in irregular two dimensional shapes on the canvas.

* * * * *